UNITED STATES PATENT OFFICE.

HANS BRACKEBUSCH, OF BERLIN, GERMANY.

PROCESS OF DEODORIZING SOLUTIONS OF COLOPHONY IN HEAVY HYDROCARBONS.

SPECIFICATION forming part of Letters Patent No. 275,565, dated April 10, 1883.

Application filed February 1, 1882. (No specimens.)

*To all whom it may concern:*

Be it known that I, HANS BRACKEBUSCH, doctor of philosophy, a citizen of the free town of Hamburg, residing at Berlin, Prussia, German Empire, have invented certain new and useful Improvements in Process of Deodorizing and Refining Solutions of Colophony in Heavy Hydrocarbons; and I do hereby declare the following to be a full, clear, and exact description of the invention, such as will enable others skilled in the art to which it appertains to make and use the same.

The object of my invention is to deodorize hydrocarbon solutions of colophony. The very strong and offensive smell of the solutions of colophony in hydrocarbon oils has heretofore tended to prevent their use in the manufacture of printing-inks, and in order that these substances may come into general use it is necessary that they should be deodorized.

The invention therefore consists essentially in the method of deodorizing hydrocarbon solutions of colophony; and it further consists in a new article of manufacture—namely, a deodorized compound of colophony and a hydrocarbon oil for use in the manufacture of printing-inks.

In carrying out my invention I first heat the prepared solution of colophony in one of the heavy hydrocarbon oils to about 120° Celsius, (by "heavy hydrocarbons" I mean products of the distillation of crude petroleum having a specific gravity of about 0.980 or 0.990,) and I then add about one per cent. of dilute hydrated nitric acid—say a solution containing from forty to forty-five per cent. of nitric acid. This produces a very lively foaming reaction that has the effect of deodorizing the solution. This reaction, however, results in nitro combinations that must be neutralized or removed from the deodorized colophony solution, as these will attack the type when the colophony is employed in the manufacture of printing-ink. To effect this I allow the varnish to cool until it has become lukewarm and then treat the same with dilute sulphuric acid and iron filings by adding to the heated mass about one per cent. of fine iron filings and about ten per cent. of a solution of sulphuric acid, containing about five per cent. of the acid, and keep the mass agitated for about half an hour. After this intimate mixture of the sulphuric-acid solution and the iron filings I wash the varnish in warm water by agitation to remove the undesirable nitro combinations. The mass is then allowed to remain at rest until the iron filings have settled, and the pure varnish is then decanted or drawn off. The washing may also be effected by means of steam under pressure, in which case the steam-pipe is so arranged as to discharge the steam near the bottom of the vessel that contains the varnish, and the stirring appliances may then be dispensed with.

When the odors emanated by the heated solution of hydrocarbon and colophony are extremely offensive I resort to a process of flashing—that is to say, I ignite the gases or vapors evolved by the heated and agitated solution until a large proportion of these are burned—an operation which varies in duration according to the nature of the oil, generally about ten minutes for every two hundred pounds of oil employed.

I have deemed it unnecessary to describe and illustrate any particular apparatus for carrying out the invention, as any one at all familiar with such operations will be able to readily devise a boiler provided with either stirrers or a steam-pipe; and any desired or preferred form of boiler may be employed for this purpose.

I do not wish to be understood as claiming, broadly, the method of deodorizing hydrocarbon oils by treating the same with nitric acid, as I am aware that this has been done before.

Having described my invention, what I claim is—

1. The process of deodorizing and refining solutions of colophony in heavy hydrocarbons, which consists in treating the same with nitric acid and neutralizing the nitro combinations resulting from the reaction by means of sulphuric acid and iron filings, substantially as and for the purposes specified, and in or about in the proportions set forth.

2. As a step in the process of deodorizing and refining solutions of colophony in heavy hydrocarbons, burning the vapors of the heated and agitated solution before treating the same with nitric acid as described, substantially as and for the purposes specified.

3. The process of deodorizing and refining solutions of colophony in heavy hydrocarbons, which consists in adding nitric acid to the solution, neutralizing the nitro combinations formed by the reaction produced by the nitric acid by means of sulphuric acid and iron filings in or about the proportions specified, and finally washing the varnish obtained, substantially as and for the purposes set forth.

In testimony whereof I affix my signature in presence of two witnesses.

HANS BRACKEBUSCH.

Witnesses:
  GEORGE LOUBIER,
  BERTHOLD ROI.